United States Patent
Lee et al.

(10) Patent No.: US 9,734,752 B2
(45) Date of Patent: Aug. 15, 2017

(54) DISPLAY DEVICE AND SOURCE DRIVER TO AUTOMATICALLY BLOCK DATA VOLTAGE OUTPUT TO DUMMY LINES

(71) Applicant: Samsung Display Co., Ltd., Yongin (KR)

(72) Inventors: Jae-Han Lee, Hwaseong-si (KR); Sooyeon Kim, Seoul (KR); Young-Il Ban, Hwaseong-si (KR); Sunkyu Son, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 84 days.

(21) Appl. No.: 14/751,944

(22) Filed: Jun. 26, 2015

(65) Prior Publication Data

US 2016/0125792 A1    May 5, 2016

(30) Foreign Application Priority Data

Oct. 30, 2014    (KR) ........................ 10-2014-0149404

(51) Int. Cl.
  *G09G 3/20*    (2006.01)
  *G09G 3/00*    (2006.01)
  *G02F 1/1345*    (2006.01)

(52) U.S. Cl.
  CPC .......... *G09G 3/2096* (2013.01); *G09G 3/006* (2013.01); *G02F 1/13452* (2013.01); *G09G 3/20* (2013.01);

(Continued)

(58) Field of Classification Search
  CPC .. G09G 3/3688; G09G 3/3677; G09G 3/3648; G09G 3/3614; G09G 3/006;
(Continued)

(56) References Cited

U.S. PATENT DOCUMENTS 6,535,039 B2    3/2003    Nanba et al.
6,903,589 B2    6/2005    Kim
(Continued)

FOREIGN PATENT DOCUMENTS

KR    10-0532414    12/2005
KR    10-0732924    6/2007
(Continued)

*Primary Examiner* — Ilana Spar
*Assistant Examiner* — Darlene M Ritchie
(74) *Attorney, Agent, or Firm* — H.C. Park & Associates, PLC (57) ABSTRACT

A display device including: a display panel displaying an image based on first and second frames; a timing controller outputting a plurality of image signals for each of the first and second frames and outputting a test signal during a reset section; and a source driving chip outputting a plurality of data voltages corresponding to the image signals or a test voltage corresponding to the test signal. The reset section is arranged after the first frame and before the second frame, and the source driving chip blocks the data voltage in the second frame from being output to driving lines having an arrival time period equal to or less than a reference time period during the reset section, the arrival time period representing the amount of time taken to arrive at the test voltage from an initial voltage.

15 Claims, 6 Drawing Sheets

(52) U.S. Cl.
CPC .......... *G09G 2300/0413* (2013.01); *G09G 2310/0275* (2013.01); *G09G 2310/061* (2013.01); *G09G 2310/08* (2013.01); *G09G 2330/021* (2013.01); *G09G 2330/12* (2013.01)

(58) Field of Classification Search
CPC ........ G09G 3/20; G09G 5/006; G02F 1/1309; G02F 1/136259; G02F 2001/136263; G02F 2001/136272; G02F 2001/136286
See application file for complete search history.

(56) References Cited

U.S. PATENT DOCUMENTS

| | | | |
|---|---|---|---|
| 7,256,858 B2 | 8/2007 | Yun et al. | |
| 7,532,174 B2* | 5/2009 | Luk | G09G 5/006 345/204 |
| 8,022,919 B2 | 9/2011 | Kwon et al. | |
| 2005/0128169 A1* | 6/2005 | Kang | G09G 3/20 345/87 |
| 2012/0019502 A1 | 1/2012 | Kawagoshi | |
| 2012/0105085 A1* | 5/2012 | Chen | G02F 1/1309 324/693 |
| 2012/0161660 A1* | 6/2012 | Joo | G09G 3/20 315/240 |
| 2013/0307838 A1 | 11/2013 | Kim et al. | |
| 2013/0342229 A1* | 12/2013 | Wang | G09G 3/006 324/750.3 |
| 2014/0062936 A1* | 3/2014 | Al-Dahle | G09G 3/36 345/174 |

FOREIGN PATENT DOCUMENTS

| | | |
|---|---|---|
| KR | 10-2008-0043515 | 5/2008 |
| KR | 10-0864922 | 10/2008 |
| KR | 10-1213556 | 12/2012 |
| KR | 10-2013-0128933 | 11/2013 |

* cited by examiner

DISPLAY DEVICE AND SOURCE DRIVER TO AUTOMATICALLY BLOCK DATA VOLTAGE OUTPUT TO DUMMY LINES

CROSS-REFERENCE TO RELATED APPLICATION

This application claims priority from and the benefit of Korean Patent Application No. 10-2014-0149404, filed on Oct. 30, 2014, which is hereby incorporated by reference for all purposes as if fully set forth herein.

BACKGROUND

Field

Exemplary embodiments relate to a display device. More particularly, exemplary embodiments relate to a display device that may reduce power consumption at a data driving unit.

Discussion of the Background

A display device includes a display panel displaying an image, a gate driving unit driving the display panel, and a data driving unit. The display panel includes a plurality of gate lines, a plurality of data lines, and a plurality of pixels connected to the gate lines and to the data lines. The gate lines receive gate signals from the gate driving unit. The data lines receive data voltages from the data driving unit. The pixels receive data voltages through the data lines in response to the gate signals received through the gate lines. The pixels display a gray level corresponding to the data voltages. Thus, an image is displayed.

The data driving unit may include a plurality of data driving lines electrically connected to the data lines arranged on the display panel. Because the data lines and the data driving lines are electrically connected to one another, data voltages may be provided from the data driving unit to the pixels.

For various reasons, there may be a case where the number of the data driving lines arranged on the data driving unit is greater than that of the data lines arranged on the display panel. That is, data dummy lines not connected electrically to the data lines among the data driving lines may be arranged on the data driving unit. However, because the data driving unit outputs data voltages to the data dummy lines, excess power is consumed.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device that enables a data driving unit to consume less power.

Additional aspects will be set forth in the detailed description which follows, and, in part, will be apparent from the disclosure, or may be learned by practice of the inventive concept.

An exemplary embodiment of the inventive concept discloses a display device including: a display panel configured to display an image based on first and second frames; a timing controller configured to output a plurality of image signals for each of the first and second frames and to output a test signal during a reset section; a source driving chip configured to output a plurality of data voltages corresponding to the image signals or a test voltage corresponding to the test signal; and a plurality of driving lines configured to receive the data voltage or the test voltage and to electrically connect the display panel to the source driving chip. The reset section is arranged after the first frame and before the second frame, and the source driving chip is configured to block the data voltage in the second frame from being output to driving lines having an arrival time period equal to or less than a reference time period during the reset section, the arrival time period representing the amount of time taken to arrive at the test voltage from an initial voltage.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
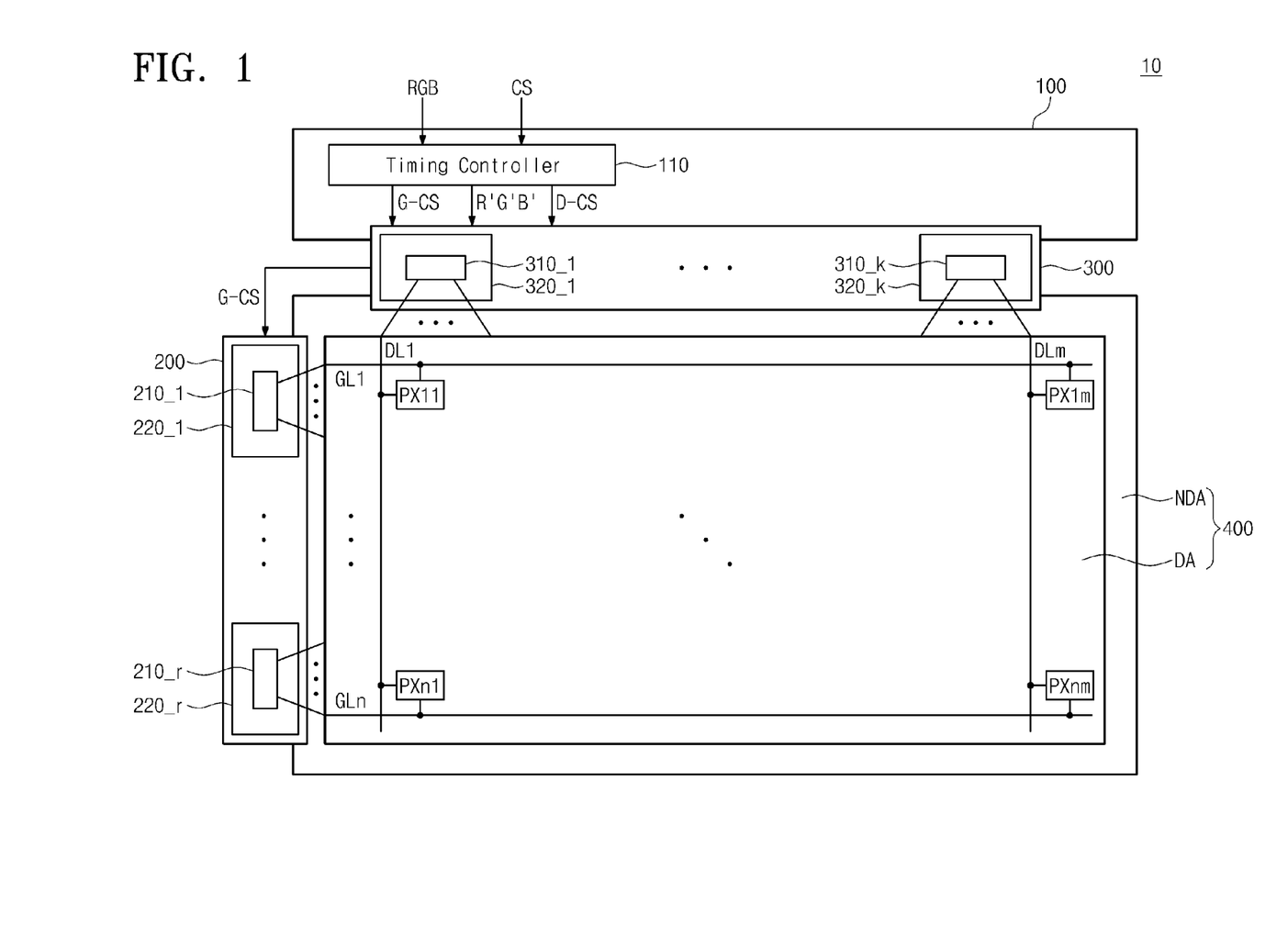
FIG. 1 is a block diagram of a display device according to an embodiment of the present invention.

FIG. 1 is a block diagram of a display device according to an embodiment of the present invention.

Referring to FIG. 1, a display device 10 includes a driving circuit substrate 100, a gate driving unit 200, a data driving unit 300, and a display panel 400.

The driving circuit substrate 100 includes a timing controller 110 controlling the overall operation of the display device 10. The timing controller 110 receives a plurality of image signals RGB and a plurality of control signals CS from the outside of the display device 10. The timing controller 110 converts the data formats of the image signals RGB to be suitable for an interface specification with the data driving unit 300. A plurality of image signals R'G'B' having converted data formats are provided to the data driving unit 300.

The timing controller 110 may output a plurality of driving signals in response to external control signals CS. For example, the timing controller 110 may generate data control signals D-CS and gate control signals G-CS as the plurality of driving signals. The data control signals D-CS may include an output start signal, a horizontal start signal, and a reset signal. The gate control signals may include a vertical start signal and a vertical clock bar signal. The timing controller 110 transmits the data control signal D-CS to the data driving unit 300 and the gate control signal G-CS to the gate driving unit 200.

The timing controller 110 may transmit the gate control signal G-CS to the gate driving unit 200 through any one source circuit substrate 320_k of the data driving unit 300.

The gate driving unit 200 generates a plurality of gate signals in response to the gate control signal G-CS provided from the timing controller 110. The gate signals are provided to pixels PX11 to PXnm sequentially through gate lines GL1 to GLn and on a row basis. As a result, the pixels PX11 to PXnm may be driven on a row basis.

Specifically, the gate driving unit 200 includes a plurality of gate driving chips 210_1 to 210_r. In this example, r is an integer greater than zero and less than m. The gate driving chips 210_1 to 210_r are mounted on a plurality of gate circuit substrates 220_1 to 220_r. The gate circuit substrates 220_1 to 220_r may be connected to a non-display area NDA adjacent to the left of a display area DA.

The data driving unit 300 receives the image signals R'G'B' and the data control signal D-CS from the timing controller 110. The data driving unit 300 generates a plurality of data voltages corresponding to the image signals R'G'B' in response to the data control signal D-CS. The data driving unit 300 provides the data voltages to the plurality of pixels PX11 to PXnm through data lines DL1 to DLm.

Specifically, the data driving unit 300 includes a plurality of source driving chips 310_1 to 310_k. In this example, k is an integer greater than zero and less than m. The source driving chips 310_1 to 310_k are mounted on the source circuit substrates 320_1 to 320_k. The source circuit substrates 320_1 to 320_k may be connected to the driving circuit substrate 100 and the non-display area NDA adjacent to the top of the display area DA.

A tape carrier package (TCP) format has been described in which the gate and source driving chips 210_1 to 210_r and 310_1 to 310_k are mounted on the gate and source circuit substrates 220_1 to 220_r and 320_1 to 320_r, for example. However, the inventive concept is not limited thereto. That is, the gate and source driving chips 210_1 to 210_r and 310_1 to 310_k may be mounted on the gate and source circuit substrates 220_1 to 220_r and 320_1 to 320_r in a chip on glass (COG) format.

The display panel 400 includes the display area DA displaying an image and the non-display area NDA disposed around the display area DA.

The display panel 400 may include the plurality of pixels PX11 to PXnm arranged on the display area DA. Also, the display panel 400 includes the plurality of gate lines GL1 to GLn and the plurality of data lines DL1 to DLm that cross the gate lines GL1 to GLn in an insulated state.

The gate lines GL1 to GLn may be connected to the gate driving unit 200 to receive sequential gate signals. The data lines DL1 to DLm may be connected to the data driving unit 300 to receive data voltages.

The pixels PX11 to PXnm are arranged on a region on which the gate lines GL1 to GLn cross the data lines DL1 to DLm. Thus, the pixels PX11 to PXnm may be arranged in n rows and m columns that cross each other. In this example, n and m are integers greater than zero.

The pixels PX11 to PXnm are connected to corresponding gate lines GL1 to GLn and corresponding data lines DL1 to DLm, respectively. The pixels PX11 to PXnm receive data voltages through the data lines DL1 to DLm in response to the gate signals transmitted through the gate lines GL1 to GLn. As a result, the pixels PX11 to PXnm may display a gray level corresponding to the data voltages.

The display device 10 according to the inventive concept may display one image for a single frame. That is, the pixels PX11 to PXnm may display a gray level corresponding to the data voltages every frame.

Figure 2:
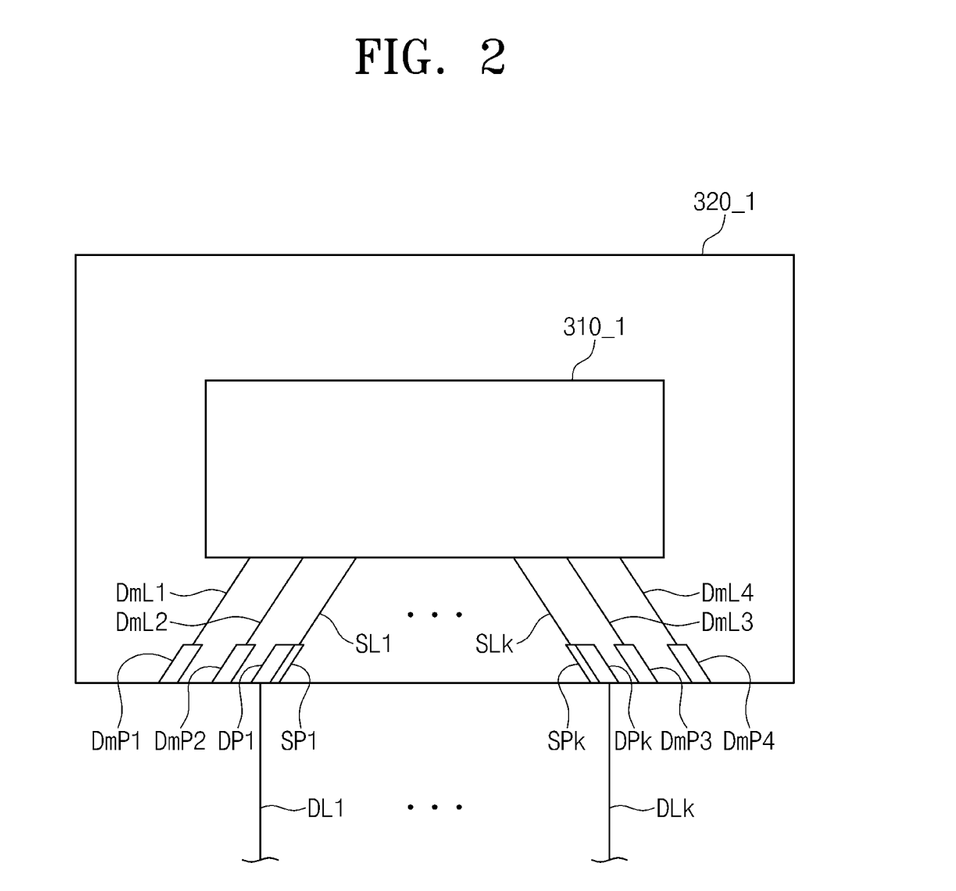
FIG. 2 is a block diagram of a source driving chip and source circuit substrate of a data driving unit in FIG. 1.

FIG. 2 is a block diagram of a source driving chip and source circuit substrate of the data driving unit in FIG. 1.

As described in FIG. 1, the data driving unit 300 includes the plurality of driving chips 310_1 to 310_k and the plurality of source circuit substrates 320_1 to 320_k. Among others, FIG. 2 describes a first source driving chip 310_1 and a first source circuit substrate 320_1.

Specifically, the first source circuit substrate 320_1 receives the plurality of image signals R'G'B' and the data control signal D-CS from the timing controller 110. A plurality of signal lines (not shown) that transmit the image signals R'G'B' and the data control signal D-CS received from the timing controller 110 to the first source driving chip 310_1 may be arranged on the first source circuit substrate 320-1. The signal lines may be arranged on the first source circuit substrate 320_1. For example, the timing controller 110 may transmit the gate control signal G-CS to the gate driving unit 200 through the signal lines arranged on the first source circuit substrate 320_1.

A plurality of data driving lines SL1 to SLk and first to fourth dummy lines DmL1 to DmL4 are arranged under the first source circuit substrate 320_1. Although the first to fourth dummy lines DmL1 to DmL4 are arranged under the first source circuit substrate 320_1, a plurality of dummy lines may be alternatively arranged. Also, each of the plurality of source circuit substrates 320_1 to 320_k may or may not include dummy lines.

One end of the data driving lines SL1 to SLk is connected to the first source driving chip 310_1, and the other end thereof is connected to a plurality of driving pads SP1 to SPk. One end of the first to fourth dummy lines DmL1 to DmL4 is connected to the first source driving chip 310_1, and the other end thereof is connected to a plurality of dummy pads DmP1 to DmP4.

Also, one end of each of the data lines DL1 to DLm arranged on the display panel 400 (see FIG. 1) may be connected to a data pad. Each data pad may be electrically connected to each driving pad disposed on the source circuit substrate 320_k. For example, the driving pads SP1 to SPk connected to the other end of the data driving lines SL1 to SLk may be electrically connected to the data pads DP1 to DPk connected to one end of the data lines DL1 to DLk. As each data pad and each driving pad are electrically connected, a data voltage output from the first source driving chip 310_1 may be transmitted to a corresponding pixel.

The first source driving chip 310_1 receives the image signals R'G'B' and the data control signal D-CS through the driving lines (not shown) arranged on the first source circuit substrate 320_1. The first source driving chip 310_1 converts the image signals R'G'B' into data voltages in response to the data control signal D-CS. The data voltages obtained through conversion are transmitted to the data lines DL1 to DLk through the data driving lines SL1 to SLk.

The first to fourth dummy lines DmL1 to DmL4 are not connected electrically to the data lines arranged on the display panel 400. For example, the dummy pads DmP1 to DmP4 connected to the other end of the first to fourth dummy lines DmL1 to DmL4 may be connected to the ground. However, the first source driving chip 310_1 also supplies driving voltages to the first to fourth dummy lines DmL1 to DmL4. For example, the driving voltage may be a test voltage for testing the level of the data voltage. Also, the first source driving chip 310_1 may provide the data voltage to the first to fourth dummy lines DmL1 to DmL4, for example.

In this case, because unnecessary driving voltages or data voltages are provided from the first source driving chip 310_1, the total power consumption of the display device 10 may increase.

The display device 10 according to an exemplary embodiment may allow a voltage not to be applied from each source driving chip to dummy pads. As a result, the total power consumption of the display device 10 may decrease.

Figure 3:
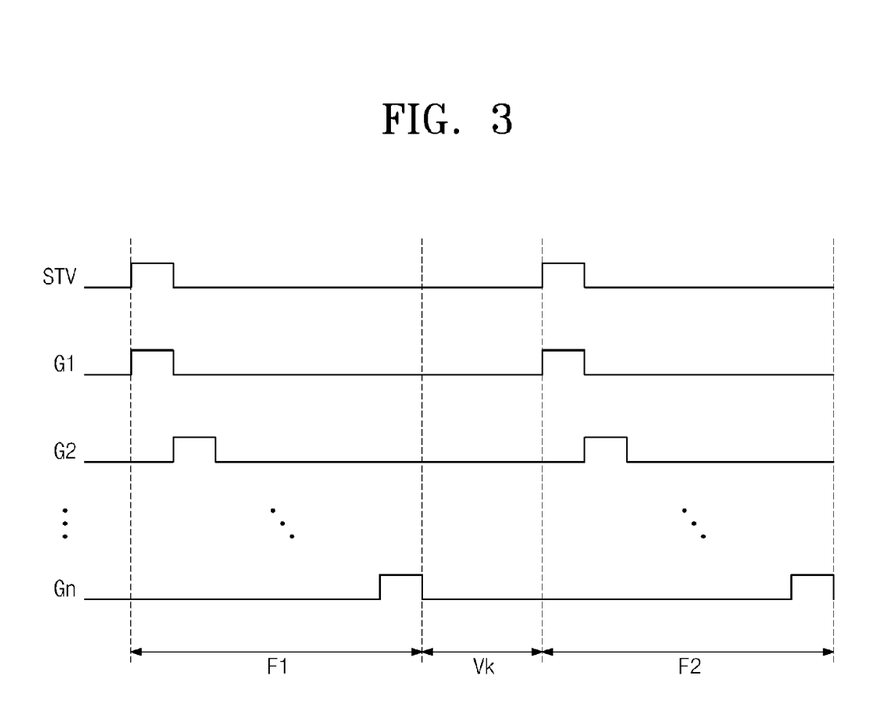
FIG. 3 is a timing diagram showing how a plurality of gate signals are output from a gate driving unit in FIG. 1.

FIG. 3 is a timing diagram showing how a plurality of gate signals are output from a gate driving unit in FIG. 1.

Referring to FIGS. 1 and 3, the gate driving unit 200 (see FIG. 1) receives the gate control signal G-CS output from the timing controller 110. In this example, the gate control signal G-CS may be a vertical start signal STV. The vertical start signal STV may be a signal controlling the operations of gate signals G1 to Gn output from the gate driving unit 200. That is, the gate driving unit 120 may sequentially output the gate signals G1 to Gn depending on each frame in response to the vertical start signal STV. An image may be displayed for each frame.

In the following, first and second frames F1 and F2 of a plurality of frames are described.

First, the vertical start signal STV and a first gate signal G1 together may be transited to an activated level for the first frame F1. However, the inventive concept is not limited thereto. That is, the vertical start signal STV may be transited to the activated level in a section before the first gate signal G1 is activated.

Subsequently, as the first gate signal G1 is transited to an inactivated level, the gate driving unit 120 outputs a second gate signal G2 having the activated level. That is, as the first gate signal G1 is transited to the inactivated level, a second gate signal G2, which is the next gate signal, may be transited to the activated level. As the above operations are repeated, the plurality of gate signals G1 to Gn may be sequentially output in response to the vertical start signal STV. Each source driving chip transmits data voltages corresponding to the image signals of the first frame F1 to the data lines DL1 to DLm. The pixels PX11 to PXnm receive the data voltages from the data lines DL1 to DLm in response to the gate signals G1 to Gn sequentially output. The pixels PX11 to PXnm display an image in response to the data voltages.

After the first frame F1, a reset section Vk may be set. During the reset section Vk, the timing controller 110 may reset information on image signals provided for the first frame F1. That is, the reset section Vk may be a section resetting image signals between the previous frame and the following frame. After the reset section Vk, the second frame F2 may be a section repeating the first frame F1. Thus, related descriptions are not provided.

According to an exemplary embodiment, the timing controller 110 transmits a test signal and reset signal instead of the image signals R'G'B' to the source driving chips 310_1 to 310_k for the reset section Vk. The source driving chips 310_1 to 310_k may output a test voltage based on the test signal. Each of the source driving chips 310_1 to 310_k may include a voltage generation unit (not shown) generating the test voltage corresponding to the test signal in response to the reset signal. For example, the reset signal may be included in the data control signal D-CS. Also, the voltage generation unit (not shown) may generate data voltages corresponding to the image signals R'G'B' in response to the data control signal D-CS for each frame.

Figure 4:
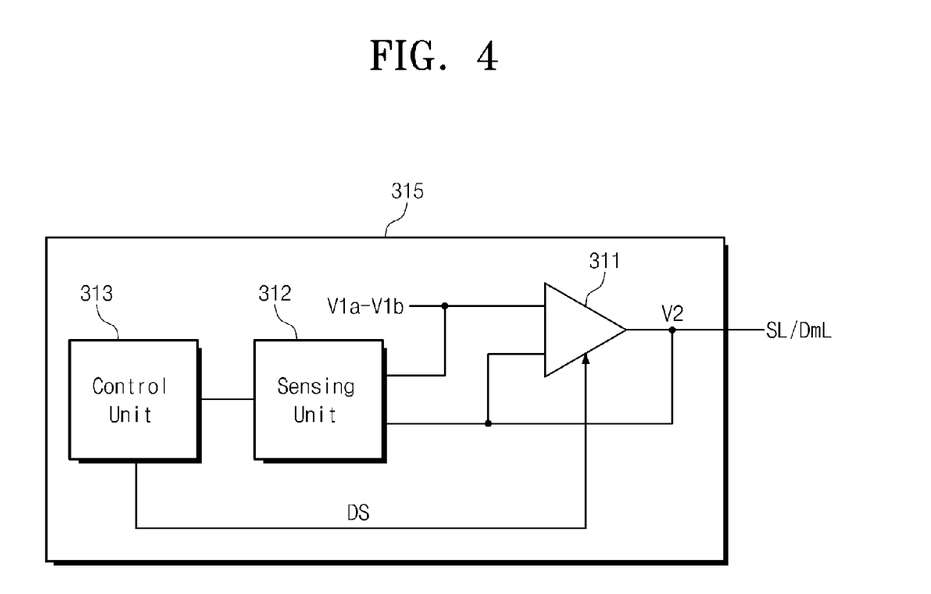
FIG. 4 is a block diagram showing the source driving chip in FIG. 2.

FIG. 4 is a block diagram showing the source driving chip in FIG. 2.

Referring to FIGS. 1 and 4, each of the source driving chips 310_1 to 310_k may include a plurality of source units. Each of the source units included in each source driving chip may be electrically connected to a corresponding one of data driving lines or a corresponding one of dummy lines. In the description that follows, the source unit 315 in FIG. 4 may be any one of the source units included in the source driving chips 310_1 to 310_k. In the description that follows, the source unit 315 operates based on the reset section Vk (see FIG. 3).

Specifically, the source unit 315 includes a comparator 311, a sensing unit 312, and a control unit 313.

The comparator 311 receives a test voltage V1 through a first terminal during the reset section Vk (see FIG. 3). The test voltage V1 may include a first test voltage V1a and a second test voltage V1b. According to an exemplary embodiment, the first text voltage V1a having the maximum gray level of 255 and the second test voltage having the minimum gray level of 0 may be repetitively output to the source unit 315 during the reset section Vk. Also, the comparator 311 receives a comparison voltage V2 fed back through a second terminal. The comparison voltage V2 is a voltage output from the comparator 311. That is, the comparator 311 compares the test voltage V1 with the comparison voltage V2 fed back, and outputs a new comparison voltage V2 according to a comparison result. The output terminal of the comparator 311 is connected to the data driving line SL or to the dummy line DmL. Also, the comparator 311 may or may not operate in response to a disable signal DS received from the control unit 313.

As described above, the timing controller 110 transmits the test voltage V1 and a reset signal Rs (see FIG. 5) instead of the image signals R'G'B' to the source driving chip 310_k during the reset section Vk. During the reset section Vk, the timing controller 110 may provide the reset signal Rs having an activated state to the source driving chip 310_k. Specifically, the voltage generation unit (not shown) included in the source driving chip 310_k may generate the first and second test voltages V1a and V1b corresponding to test signals in response to the reset signal Rs having the activated state.

Also, the timing controller 110 transmits the image signals R'G'B' to the data driving unit 300 for each frame and not during the reset section Vk. As a result, the comparator 311 may receive data voltages corresponding to the image signals R'G'B' for each frame.

The sensing unit 312 receives the test voltage V1 through the first terminal. The sensing unit 312 receives the comparison voltage V2 output from the comparator 311 through the second terminal. According to an exemplary embodiment, the sensing unit 312 senses an arrival time period taken for the level of the comparison voltage V2 to arrive at the first test voltage V1a from the initial voltage. The sensing unit 312 provides a sensing signal, including the arrival time period, to the control unit 313.

The control unit 313 receives the sensing signal from the sensing unit 312. The control unit 313 determines, according to the arrival time period, whether the comparator 311 is connected to the data driving line SL or to the dummy line DmL. The control unit 313 may determine the activated state of the disable signal DS according to a determination result.

As an example, the control unit 313 transmits the disable signal DS having the activated state to the comparator 311 when it is determined that the arrival time period is less than a reference time period. The comparator 311 does not output a data voltage in a following frame section after the reset section Vk in response to the disable signal DS having the activated state. That is, the comparator 311 may not operate in response to the disable signal DS having the activated state. As a result, because an unnecessary voltage is not output to the dummy line, the total power consumption of the display device 10 may decrease.

As an example, the control unit 313 transmits the disable signal DS having the activated state to the comparator 311 when it is determined that the arrival time period is equal to or greater than the reference time period. The comparator 311 may output a data voltage in a following frame section after the reset section Vk in response to the disable signal DS having the inactivated state.

However, the technical spirit of the inventive concept is not limited thereto. That is, the control unit 313 may transmit the disable signal DS having the activated state to the comparator 311 when it is determined that the arrival time period is less than or equal to the reference time period. In this case, the control unit 313 transmits the disable signal DS having the inactivated state to the comparator 311 when the arrival time period exceeds the reference time period. Also, the control unit 313 may determine the activated state of the disable signal DS depending on whether the arrival time period is less than or greater than the reference time period. In the description that follows, the control unit 313 determines the activated state of the disable signal DS depending on whether the arrival time period is less than or greater than the reference time period.

Figure 5:
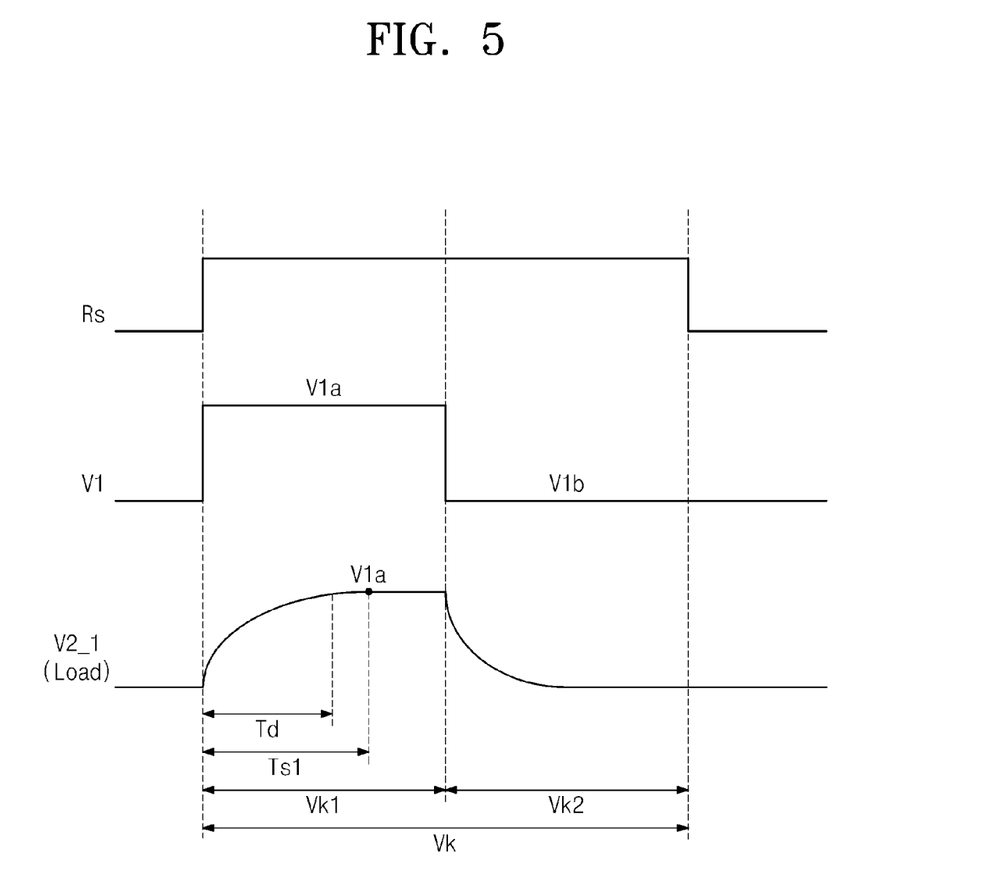
FIG. 5 is a timing diagram showing an output voltage when a source unit in FIG. 4 is connected to a data driving line.
Figure 6:
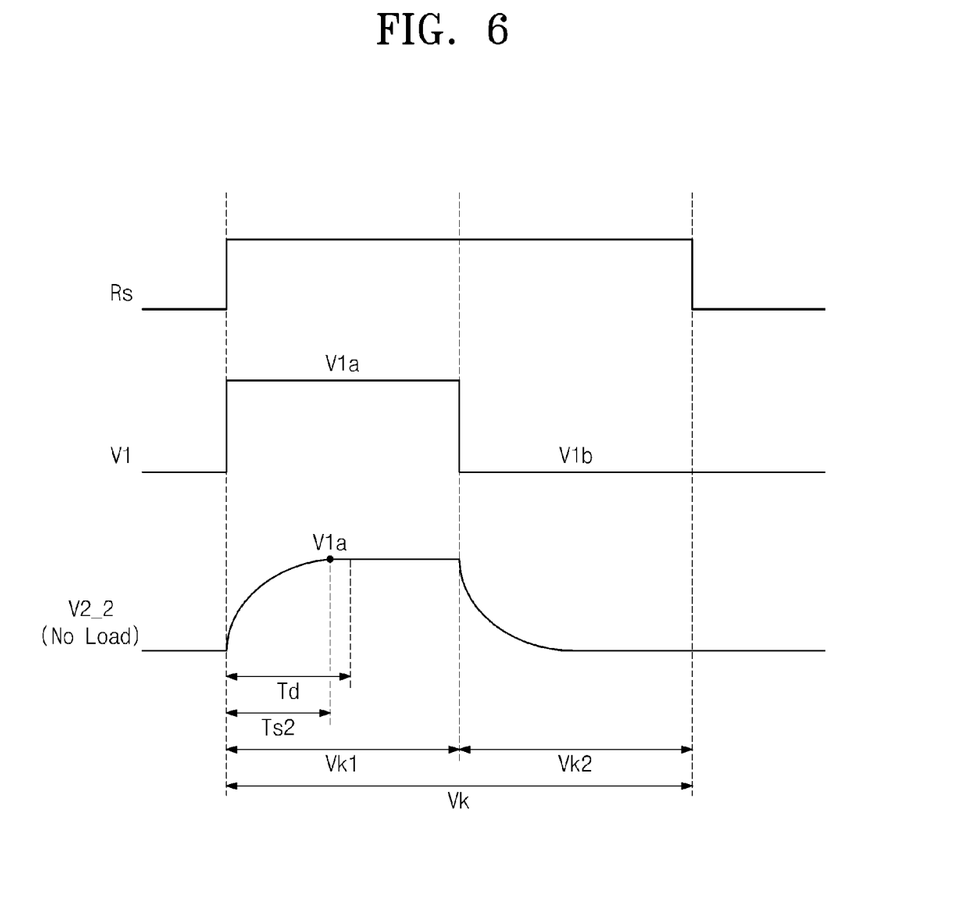
FIG. 6 is a timing diagram showing an output voltage when the source unit in FIG. 4 is connected to a dummy line.

FIG. 5 is a timing diagram showing an output voltage when a source unit in FIG. 4 is connected to a data driving line. FIG. 6 is a timing diagram showing an output voltage when the source unit in FIG. 4 is connected to a dummy line.

Referring to FIGS. 4 and 5, a reset section Vk may be set after the first frame F1 and before the second frame F2 as shown in FIG. 3. During the reset section Vk, the timing controller 110 (see FIG. 1) transmits the reset signal Rs having an activated state and the test signal to the source driving chip 310_k (see FIG. 1). The reset section Vk may be set as a first reset section Vk1 in which the first test voltage V1a is output, and a second reset section Vk2 in which the second test voltage V1b is output.

In the following, a first comparison voltage V2_1 may be a voltage output from the comparator 311 when the source unit 315 is connected to the data driving line SL. Also, a second comparison voltage V2_2 may be a voltage output from the comparator 311 when the source unit 315 is connected to the dummy line DmL.

The comparator 311 feeds the first test voltage V1a and the first comparison voltage V2_1 back in the first reset section Vk1, and outputs a new first comparison voltage V2_1 according to a comparison result. In this case, until the first comparison voltage V2_1 arrives at the first test voltage V1a from the initial voltage, the first comparison voltage may continue to increase and be output from the comparator 311.

The sensing unit 312 senses a first arrival time period Ts1 representing the amount of time taken for the first comparison voltage V2_1 to arrive at the first test voltage V1a. The sensing unit 312 transmits a sensing signal including the first arrival time period Ts1 to the control unit 313.

In this case, because the first arrival time period Ts1 is greater than a reference time period Td, the control unit 313 determines that the output terminal of the comparator 311 is connected to the data driving line SL. Specifically, because a voltage is consumed through the data line DL (see FIG. 1) electrically connected to the data driving line SL, an increase in the level of the first comparison voltage V2_1 may slowly increase. That is, because the data line DL acts as a load, the level of the first comparison voltage V2_1 may slowly increase.

Thus, the control unit 313 outputs the disable signal DS having an inactivated state to the comparator 311. As a result, after the reset section Vk, a data voltage may be output from the comparator 311 in a following frame.

Subsequently, during the second reset section Vk2, the comparator 311 compares the second test voltage V1b with a fed back first comparison voltage V2_1, and outputs a new first comparison voltage V2_1 according to a comparison result. The first comparison voltage V2_1 continues to decrease from the first test voltage V1a to the second test voltage V1b.

After the reset section Vk, the comparator 311 may receive a data voltage depending on each frame instead of the test voltage V1.

Next, FIG. 6 shows a case where the source unit 315 is connected to a dummy line.

Specifically, the comparator 311 feeds the first test voltage V1a and the second comparison voltage V2_2 back in the first reset section Vk1, and outputs a new second comparison voltage V2_2 according to a comparison result. In this case, until the second comparison voltage V2_2 arrives at the first test voltage V1a from the initial voltage, the second comparison voltage may continue to increase and be output from the comparator 311.

The sensing unit 312 senses a second arrival time period Ts2 representing the amount of time taken for the second comparison voltage V2_2 to arrive at the first test voltage V1a. The sensing unit 312 transmits a sensing signal including the second arrival time period Ts2 to the control unit 313.

In this case, because the second arrival time period Ts2 is less than the reference time period Td, the control unit 313 determines that the output terminal of the comparator 311 is connected to the dummy line DmL. Specifically, because the dummy line DmL has no load and is connected to the ground terminal, an increase in the level of the second comparison voltage V2_2 may be faster than an increase in the level of the first comparison voltage V2_1.

Thus, the control unit 313 outputs the disable signal DS having an activated state to the comparator 311. As a result, the comparator 311 does not output a data voltage in a following frame after the reset section Vk in response to the disable signal DS having the activated state.

Subsequently, during the second reset section Vk2, the comparator 311 compares the second test voltage V1b with a fed back second comparison voltage V2_2, and outputs a new second comparison voltage V2_2 according to a comparison result. Specifically, the second comparison voltage V2_2 continues to decrease from the first test voltage V1a to the second test voltage V1b.

Likewise, after the reset section Vk, the comparator 311 may receive a data voltage depending on each frame instead of the test voltage V1.

As described above, the display device according to the inventive concept may not output an unnecessary voltage from the source driving chip through the dummy lines. As a result, the total power consumption of the display device may decrease.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device comprising:
    a display panel configured to display an image based on first and second frames;
    a timing controller configured to output a plurality of image signals for each of the first and second frames and to output a test signal during a reset section;
    a source driving chip configured to output a plurality of data voltages corresponding to the image signals or a test voltage corresponding to the test signal; and
    a plurality of driving lines configured to receive the data voltage or the test voltage and electrically connecting the display panel to the source driving chip,
    wherein:
    the reset section is arranged after the first frame and before the second frame;
    the source driving chip comprises a plurality of source units, each source unit being electrically connected to a corresponding one of the driving lines;
    the source driving chip is configured to block the data voltage in the second frame from being output to driving lines having an arrival time period equal to or less than a reference time period during the reset section, the arrival time period representing the amount of time taken to arrive at the test voltage from an initial voltage; and
    each source unit comprises:
    a comparator configured to compare the test voltage received through a first terminal with a feedback voltage received through a second terminal and to provide a comparison voltage according to a comparison result to a corresponding driving line;
    a sensing circuit configured to receive the test voltage and the comparison voltage and to sense the arrival time period representing the amount of time taken for the comparison voltage to arrive at the test voltage from the initial voltage; and
    a control circuit configured to output a disable signal comprising an activated state disabling the comparator when the arrival time period is equal to or less than the reference time period.

2. The display device of claim 1, wherein:
    the timing controller is configured to generate a data control signal in response to an external control signal; and
    the source driving chip is configured to output any one of the data voltages and the test voltage in response to the data control signal.

3. The display device of claim 1, wherein a plurality of source circuit substrates, each of which comprises the source driving chip, are provided and the driving lines are arranged on each source circuit substrate.

4. The display device of claim 1,
    wherein the feedback voltage received by the second terminal is feedback of the comparison voltage.

5. The display device of claim 4, wherein the control circuit is configured to output a disable signal having an inactivated state enabling the comparator when the arrival time period is greater than the reference time period.

6. The display device of claim 4, wherein the timing controller is configured to output a reset signal having an inactivated state to the source driving chip for the first and second frames.

7. The display device of claim 4, wherein the timing controller is configured to output a reset signal having an activated state to the source driving chip during the certain reset section.

8. The display device of claim 7, wherein the source driving chip comprises a voltage generation unit configured to generate the test voltage corresponding to the test signal in response to the reset signal having the activated state.

9. The display device of claim 4, wherein the test voltage comprises a first test voltage and a second test voltage.

10. The display device of claim 9, wherein a level of the first test voltage is a gray level voltage having a maximum gray level, and a level of the second test voltage is a gray level voltage having a minimum gray level.

11. The display device of claim 10, wherein during the reset section, the first and second test voltages are repetitively provided to the first terminal of the comparator and to the sensing circuit.

12. The display device of claim 10, wherein the sensing circuit is configured to sense the arrival time period taken for the comparison voltage output from the comparator to arrive at the level of the first test voltage.

13. The display device of claim 1, wherein the display panel comprises a plurality of pixels connected to a plurality data lines and to a plurality gate lines.

14. The display device of claim 13, wherein:
the driving lines comprise a plurality of data driving lines and a plurality of dummy lines; and
each data line is electrically connected to a corresponding one of the data driving lines.

15. The display device of claim 14, wherein the dummy lines are connected to a ground.

\* \* \* \* \*